US007644102B2

(12) United States Patent
Gaussier et al.

(10) Patent No.: US 7,644,102 B2
(45) Date of Patent: Jan. 5, 2010

(54) METHODS, SYSTEMS, AND ARTICLES OF MANUFACTURE FOR SOFT HIERARCHICAL CLUSTERING OF CO-OCCURRING OBJECTS

(75) Inventors: Eric Gaussier, Eybens (FR); Francine Chen, Menlo Park, CA (US); Ashok Chhabedia Popat, San Carlos, CA (US)

(73) Assignee: Xerox Corporation, Norwalk, CT (US)

( * ) Notice: Subject to any disclaimer, the term of this patent is extended or adjusted under 35 U.S.C. 154(b) by 851 days.

(21) Appl. No.: 09/982,236

(22) Filed: Oct. 19, 2001

(65) Prior Publication Data

US 2003/0101187 A1 May 29, 2003

(51) Int. Cl.
*G06F 17/30* (2006.01)

(52) U.S. Cl. .................... 707/104.1; 707/100; 707/101; 707/102; 707/103 R

(58) Field of Classification Search ................. 707/1–4, 707/6, 10, 100–104.1
See application file for complete search history.

(56) References Cited

U.S. PATENT DOCUMENTS 5,761,418 A * 6/1998 Francis et al. ............... 709/201
5,819,258 A * 10/1998 Vaithyanathan et al. ........ 707/2
5,864,855 A * 1/1999 Ruocco et al. ................ 707/10
5,983,246 A * 11/1999 Takano ....................... 715/514
6,078,913 A * 6/2000 Aoki et al. ..................... 707/2
6,154,213 A * 11/2000 Rennison et al. ............ 345/854
6,233,575 B1 * 5/2001 Agrawal et al. ................ 707/6
6,460,025 B1 * 10/2002 Fohn et al. .................... 706/45
6,460,036 B1 * 10/2002 Herz ........................... 707/10
6,556,958 B1 * 4/2003 Chickering .................... 703/2
6,742,003 B2 * 5/2004 Heckerman et al. ...... 707/104.1
2002/0129038 A1 * 9/2002 Cunningham ............... 707/200
2003/0018637 A1 * 1/2003 Zhang et al. .................. 707/6

FOREIGN PATENT DOCUMENTS

EP 0 704 810 A1 4/1996

OTHER PUBLICATIONS

Willett, Peter, "Document Clustering using an Inverted File Approach," Journal of Information Science, 2, 1980, pp. 223-231.
Willett, Peter, "Recent Trends in Hierarchical Document Clustering: A Critical Review," Information Processing and Management, Vo. 24, No. 5, 1988, pp. 577-597.

(Continued)

*Primary Examiner*—Cam-Linh Nguyen
(74) *Attorney, Agent, or Firm*—Fay Sharpe LLP

(57) ABSTRACT

Methods, systems, and articles of manufacture consistent with certain principles related to the present invention enable a computing system to perform hierarchical topical clustering of text data based on statistical modeling of co-occurrences of (document, word) pairs. The computing system may be configured to receive a collection of documents, each document including a plurality of words, and perform a modified deterministic annealing Expectation-Maximization (EM) process on the collection to produce a softly assigned hierarchy of nodes. The process may involve assigning documents and document fragments to multiple nodes in the hierarchy based on words included in the documents, such that a document may be assigned to any ancestor node included in the hierarchy, thus eliminating the hard assignment of documents in the hierarchy.

23 Claims, 7 Drawing Sheets

OTHER PUBLICATIONS

Sahami, Mehran et al., "Applying the Multiple Cause Mixture Model to Text Categorization," Proceedings of the Thirteenth International Conference on Machine Learning, 1996, pp. 435-443.
Hofmann, Thomas, "Probabilistic Latent Semantic Indexing," Proceedings of SIGIR, 1999, pp. 50-57.
Dempster, A.P., "Maximum Likelihood from Incomplete Data via the EM Algorithm," Journal of the Royal Statistical Society, Series B, 1977, pp. 1-39.
Rose, Kenneth et al., "Statistical Mechanics and Phase Transitions in Clustering," Physical Review Letters, vol. 65, No. 8, Aug. 20, 1990, pp. 945-948.
Buhmann, J. M., et al., "A Maximum Entropy Approach to Pairwise Data Clustering," Proceedings of the International Conference on Pattern Recognition, 1994, pp. 1-6.
Pereria, Fernando et al., "Distributional Clustering of English Words," Meeting of the Association for Computer Linguistics, 1993.
Ueda, Naonori et al., "Deterministic Annealing Variant of the EM Algorithm," Advances in Neural Information Processing Systems 7, 1995, pp. 545-552.
McLachlan, Geoffrey et al., "The EM Algorithm and Extensions," Wiley, New York, 1997.
T. Hoffman and J. Puzicha, "Statistical Models for Co-Occurrence Data," MIT Technical Report; A.I. Memo 1625, Feb. 1998, 22 pages.
E. Gaussier and N. Cancedda, "Probabilistic Models for Terminology Extraction and Knowledge Structuring from Documents," 2001 IEEE International Conference on Systems, Man and Cybernetics. vol. 2, Oct. 7, 2001, pp. 945-950.
E. Gaussier et al., "A Hierarchical Model for Clustering and Categorising Documents," Proceedings on Advances in Information Retrieval; 24$^{th}$ BCS-IRSG European Colloquium on IR Research, Glasgow, UK, Lecture Notes in Computer Science; vol. LNCS-2291; Mar. 25, 2002; pp. 229-247.

* cited by examiner

METHODS, SYSTEMS, AND ARTICLES OF MANUFACTURE FOR SOFT HIERARCHICAL CLUSTERING OF CO-OCCURRING OBJECTS

DESCRIPTION OF THE INVENTION

1. Field of the Invention

This invention relates to hierarchical clustering of objects, and more particularly, to methods, systems, and articles of manufacture for soft hierarchical clustering of objects based on a co-occurrence of object pairs.

2. Background of the Invention

The attractiveness of data categorization continues to grow based, mostly in part, on the availability of data through a number of access mediums, such as the Internet. As the popularity of such mediums increases, so has the responsibility of data providers to offer quick and efficient access to data. Accordingly, these providers have incorporated various techniques to ensure data may be efficiently accessed. One such technique is the organization of data using clustering. Clustering allows data to be hierarchically grouped (or clustered) based on the its characteristics. The premise behind such clustering techniques is that objects, such as text data in documents, that are similar to each other are placed in a common cluster in a hierarchy. For example, subject catalogs offered by data providers such as Yahoo™, may categorize data by creating a hierarchy of clusters where general category clusters are located at top levels and lower level cluster leaves are associated with more specific topics.

Although conventional organization techniques, such as hierarchical clustering, allow common objects to be grouped together, the resultant hierarchy generally includes a hard assignment of objects to clusters. A hard assignment refers to the practice of assigning objects to only one cluster in the hierarchy. This form of assignment limits the potential for an object, such as a textual document, to be associated with more than one cluster. For example, in a system that generates topics for a document collection, a hard assignment of a document (object) to a cluster (topic) prevents the document from being included in other clusters (topics). As can be seen, hierarchical clustering techniques that result in hard assignments of objects, such as text data, may prevent these objects from being effectively located during particular operations, such as text searches on a document collection.

SUMMARY OF THE INVENTION

It is therefore desirable to have a method and system for hierarchically clustering objects such that any given object may be assigned to more than one cluster in a hierarchy.

Methods, systems and articles of manufacture consistent with certain principles related to the present invention, enable a computing system to receive a collection of documents, each document including a plurality of words, and assign portions of a document to one or more clusters in a hierarchy based on a co-occurrence of each portion with one or more words included in the document. Methods, systems, and articles of manufacture consistent with certain principles related to the present invention may perform the assignment features described above by defining each document in a collection as a first object (e.g., "i") and the words of a given document as a second object (e.g., "j"). Initially, the collection may be assigned to a single class that may represent a single root cluster of a hierarchy. A modified Expectation-Maximization (EM) process consistent with certain principles related to the present invention may be performed based on each object pair (i,j) defined within the class until the root class splits into two child classes. Each child class is then subjected to the same modified EM process until the respective child class splits again into two more child classes. The process repeats until selected constraints associated with the hierarchy have been met, such as when the hierarchy reaches a maximum number of leaf clusters. The resultant hierarchy may include clusters that each include objects that were assigned to other clusters in the hierarchy, including clusters that are not ancestors of each other.

Additional aspects of the invention will be set forth in part in the description which follows, and in part will be obvious from the description, or may be learned by practice of methods, systems, and articles of manufacture consistent with features of the present invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Figure 1:
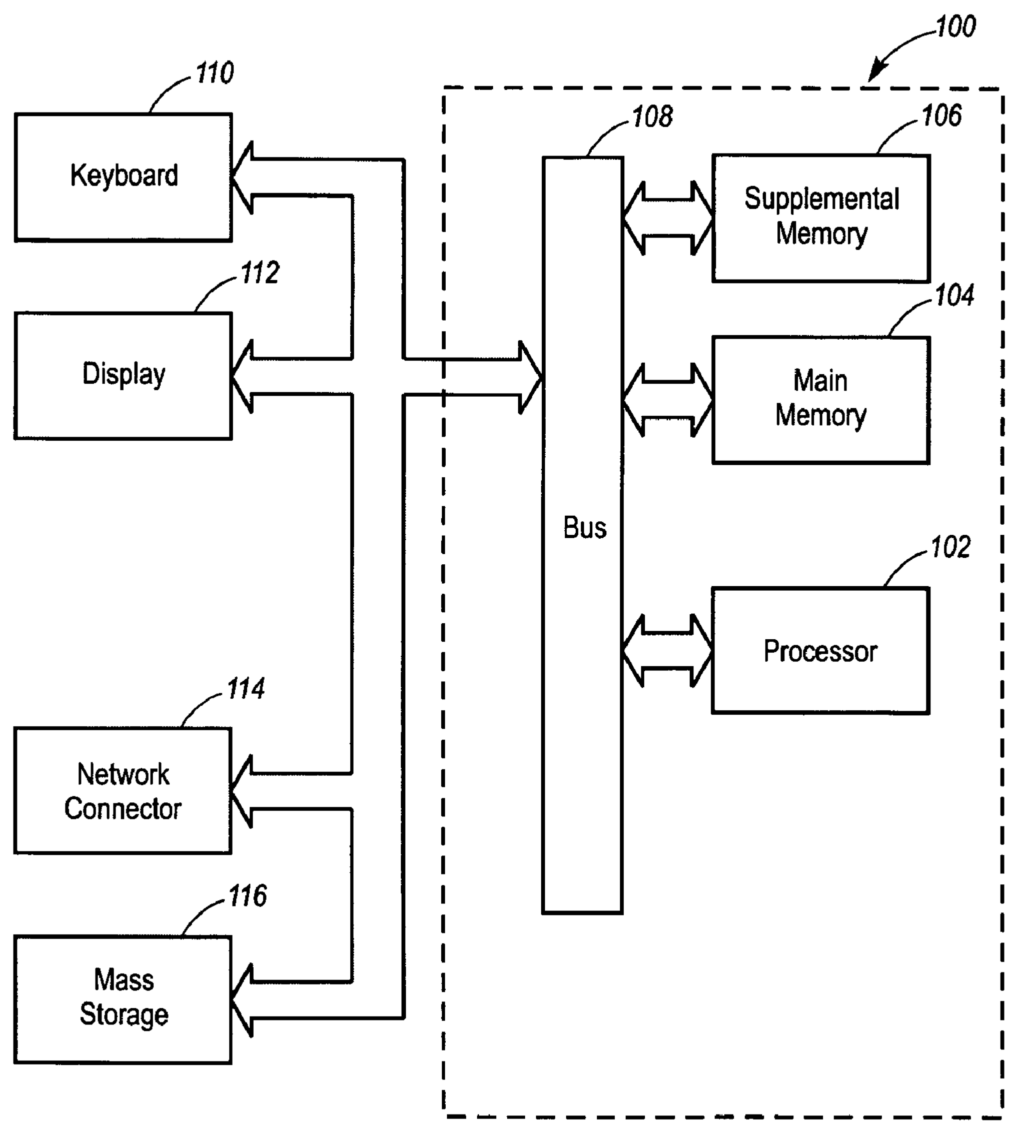
FIG. 1 illustrates an exemplary computing system environment from which methods, systems, and articles of manufacture consistent with certain principles of the present invention may be implemented.

Methods, systems, and articles of manufacture consistent with features and principles of the present invention enable a computing system to perform soft hierarchical clustering of a document collection such that any document may be assigned to more than one topic in a topical hierarchy, based on words included in the document.

Methods, systems and articles of manufacture consistent with features of the present invention may perform the above functions by implementing a modified Expectation-Maximization (EM) process on object pairs reflecting documents and words, respectively, such that a given class of the objects ranges over all nodes of a topical hierarchy and the assignment of a document to a topic may be based on any ancestor of the given class. Moreover, the assignment of a given document to any topic in the hierarchy may be based on a particular (document, word) pairs under consideration during the process. Methods, systems, and articles of manufacture, consistent with certain principles related to the present invention may perform the modified EM process for every child class that is generated from an ancestor class until selected constraints associated with the topical hierarchy are met. A representation of the resultant hierarchy of topical clusters may be created and made available to entities that request the topics of the document collection.

Reference will now be made in detail to the exemplary aspects of the invention, examples of which are illustrated in the accompanying drawings. Wherever possible, the same reference numbers will be used throughout the drawings to refer to the same or like parts.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

FIG. 1 illustrates an exemplary computing system environment in which certain features and principles consistent with the present invention may be implemented. As shown, the computing system environment may include a computer system 100 that may be a desktop computer, workstation, mainframe, client, server, laptop, personal digital assistant or any other similar general-purpose or application specific computer system known in the art. For example, computer 100 may include a processor 102, main memory 104, supplemental memory 106, bus 108, and numerous other elements and functionalities available in computer systems. These elements may be associated with various input/output devices, via bus 108, such as a keyboard 110, display 112, network connector 114, and mass storage 116.

Processor 102 may be any general-purpose or dedicated processor known in the art that performs logical and mathematical operations consistent with certain features related to the present invention. Although FIG. 1 shows only one processor 102 included with computer 100, one skilled in the art would realize that a number of different architectures may be implemented by methods, systems, and articles of manufacture, consistent with certain features related to the present invention. For example, processor 102 may be replaced, or supplemented, by a plurality of processors that perform multi-tasking operations.

Main memory 104 and supplemental memory 106 may be any known type of storage device that stores data. Main memory 104 and supplemental memory 106 may include, but are not limited to, magnetic, semiconductor, and/or optical type storage devices. Supplemental memory 106 may also be a storage device that allows processor 102 quick access to data, such as a cache memory. In one configuration consistent with selected features related to the present invention, main memory 104 and supplemental memory 106 may store data to be clustered, clustered data, and/or program instructions to implement methods consistent with certain features related to the present invention.

Bus 108 may be a single and/or multiple bus configuration that allows data to be transferred between components of computer 100 and external components, such as the input/output devices comprising keyboard 110, display 112, network connector 114, and mass storage 116. Keyboard 110 may allow a user of the computing system environment to interact with computer 100 and may be replaced and/or supplemented by other input devices, such as a mouse, touch-screen components, or the like. Display 112 may present information to the user as is known in the art. Network connector 114 may be any known connection device that allows computer 100 to connect to, and exchange information with, a network such as a local-area network, or the Internet. Mass storage 116 may be any known storage device external to computer 100 that stores data. Mass storage 116 may comprise of magnetic, semiconductor, optical, and/or tape type storage devices and may store data to be clustered, clustered data, and/or program instructions that may be executed by processor 102 to perform methods consistent with certain features related to the present invention.

It should be noted that the configuration of the computing system environment shown in FIG. 1 is exemplary and not intended to be limiting. One skilled in the art would recognize that any number of configurations, including additional (or less) components than that shown in the figure, may be implemented without departing from the scope of the present invention.

Computer 100 may be configured to perform soft hierarchical clustering of objects, such as textual documents that each include a plurality of words. There are several ways soft hierarchical clustering may be performed, such as using maximum likelihood and a deterministic variant of the Expectation-Maximization (EM) algorithm. The maximum likelihood technique is one which is aimed at finding parameter values that maximize the likelihood of observing data, and is a natural framework of clustering techniques. The EM algorithm is a known algorithm used to learn the parameters of a probabilistic model within maximum likelihood. Additional description of the EM Algorithm may be found in G. J. McLachlan and T. Krishnan, "The EM Algorithm and Extensions," Wiley, New York, 1997, which is hereby incorporated by reference. A variant of the EM algorithm, known as deterministic annealing EM, performs hierarchical clustering of objects. In certain instances, however, such hierarchical clustering may result in the hard assignment of the objects. Additional information on deterministic annealing EM may be found in Rose et al., "Statistical Mechanics and Phase Transitions in Clustering," Physical Review Letters, Vol. 65, No. 8, American Physical Society, Aug. 20, 1990, pages 945-48, which is hereby incorporated by reference.

Deterministic annealing EM presents several advantages over the standard EM algorithm. The following is a brief description of this variant of the EM algorithm.

Deterministic Annealing EM

Given an observable data sample $\chi(\epsilon\chi)$, with density $p(\chi; \Theta)$, where $\Theta$ is the parameter of the density distribution to be estimated, there exists a measure space Y of unobservable data that corresponds to $\chi$.

Furthermore, given incomplete data samples $\{X=\chi_r|r=1, \ldots, L\}$, the goal of the EM algorithm is to compute the maximum likelihood estimate of $\Theta$ that maximizes the likelihood function. This amounts to maximizing the complete data log-likelihood function, noted $L_c$, and is defined as:

$$L_c((\Theta; X) = \sum_{r=1}^{L} \log p(x_r, y_r; \Theta)$$

Furthermore, the iterative procedure, which, starting with an initial estimate of $\Theta$, alternates the following two steps, has been shown to converge to a local maximum of the (complete data) log-likelihood function. This procedure is called the EM algorithm.

E-Step: Compute the Q-function as:

$$Q_\beta(\Theta; \Theta^{(t)})=E(L_c(\Theta; X)|X, \Theta^t)$$

M-Step: Set $\Theta^{(t+1)}$ equal to $\Theta$ to maximize $Q_\beta(\Theta; \Theta^{(t)})$.

By substituting for $L_c(\Theta; X)$, $Q_\beta(\Theta; \Theta^{(t)})$ may be rewritten as:

$$Q_\beta(\Theta; \Theta^{(t)}) = \sum_{r=1}^{L} \int (\log p(x_r, y_r; \Theta)) p(y_r | x_r; \Theta^{(t)}) d_{yr}$$

And, because $$p(y_r | x_r; \Theta^{(t)}) = \frac{p(x_r, y_r; \Theta^{(t)})}{\int p(x_r, y_r; \Theta^{(t)}) d y_r},$$

$Q(\Theta; \Theta^{(t)})$ may be obtained, and written as:

$$Q(\Theta; \Theta^{(t)}) = \sum_{r=1}^{L} \int (\log p(x_r, y_r; \Theta)) \frac{p(x_r, y_r; \Theta^{(t)})}{\int p(x_r, y_r; \Theta^{(t)}) d y_r} d y_r.$$

The deterministic annealing variant of the EM algorithm includes parameterizing the posterior probability in $p(y_r|x_r; \Theta^{(t)})$ with a parameter $\beta$, as follows:

$$f(y_r | x_r; \Theta) = \frac{p(x_r, y_r; \Theta)^\beta}{\int (p(x_r, y_r; \Theta))^\beta d y_r}.$$

As can be seen, when $\beta$ is 1, $f(y_r|x_r; \Theta)=p(y_r|x_r; \Theta)$. Accordingly, when the probability $p(y_r|x_r; \Theta^{(t)})$ defined in the formula for $Q(\Theta; \Theta^{(t)})$ is substituted with $f(y_r|x_r; \Theta)$, the function $Q_\beta$ coincides with the Q-function of the EM algorithm. This suggests the deterministic annealing EM algorithm. The properties of the deterministic annealing EM algorithm may be found in Ueda et al., "Advances in Neural Information Processing Systems 7," Chapter on Deterministic Annealing variant of the EM Algorithm, MIT Press, 1995, which describes the process as:

1. Set $\beta=\beta_{min}$, $0<\beta_{min}<<1$;
2. Arbitrarily choose an initial estimate $\Theta^{(0)}$, and Set t=0;
3. Iterate the following two steps until convergence:

E-Step: compute:

$$Q_\beta(\Theta; \Theta^{(t)}) = \sum_{r=1}^{L} \int (\log p(x_r, y_r; \Theta) \frac{p(x_r, y_r; \Theta^{(t)})^\beta}{\int p(x_r, y_r; \Theta^{(t)})^\beta d y_r} d y_r$$

M-Step: set $\Theta^{(t+1)}$ equal to $\Theta$, which maximizes $Q_\beta(\Theta; \Theta^{(t)})$;

4. Increase $\beta$; and
5. If $\beta<\beta_{max}$, set t=t+1, and repeat the process from step 3; otherwise stop.

The deterministic annealing EM process described above presents three main advantages over the standard EM algorithm: (1) it is more likely to converge to a global maximum than the standard EM algorithm; (2) it avoids over fitting by setting $\beta_{max}<1$; and (3) because the number of clusters needed to explain data depends on $\beta$, it induces a hierarchy of clusters.

Variations of deterministic annealing EM have been proposed to help induce a hierarchy of objects. One such model called the Hierarchical Asymmetric Clustering Model (HACM) includes a technique referred to as distributional clustering. Additional information on the HACM may be found in Hofmann et al., "Statistical Models for Co-Occurrence Data," A. I. Memo No. 1625, Massachusetts Institute of Technology, 1998. The HACM relies on two hidden variables. The first, $I_{i\alpha}$, describes the assignment of an object "i" to a class $\alpha$. The second, $V_{r\alpha\nu}$, describes the choice of a class v in a hierarchy given a class $\alpha$ and objects i and j. The notation (i,j) represents a joint occurrence of object i with object j, where (i,j) $\epsilon$IXJ, and all data is numbered and collected in a sample set $S=(i(r),j(r), r):1\leqq r\leqq L$. The two variables, $I_{i\alpha}$ and $V_{r\alpha\nu}$ are binary valued, which leads to a simplified version of the likelihood function.

Figure 2:
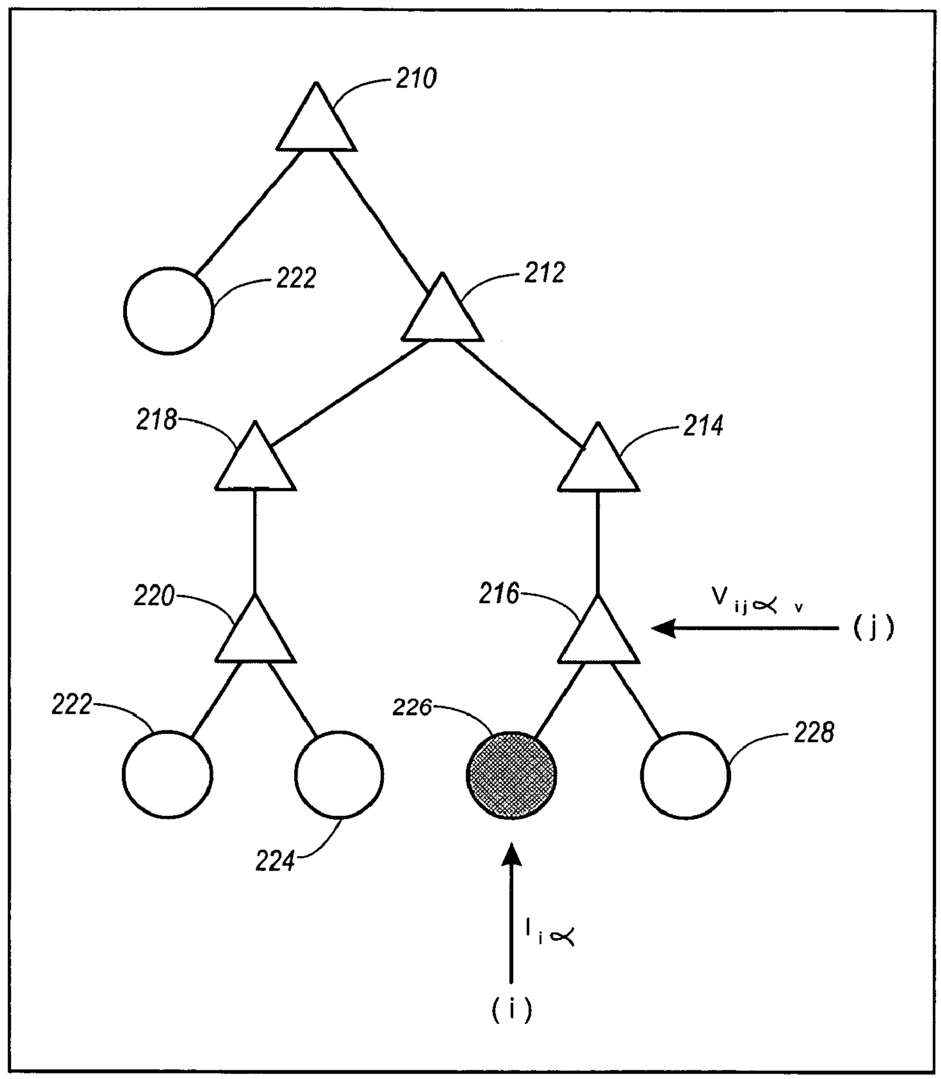
FIG. 2 illustrates an exemplary block diagram reflecting the behavior of a first hierarchical clustering model.

FIG. 2 shows a block diagram exemplifying how the HACM operates, as shown in Hofmann et al., "Statistical Models for Co-Occurrence Data," A. I. Memo No. 1625, Massachusetts Institute of Technology, 1998. As shown in FIG. 2, hierarchy 200 includes several nodes including ancestor nodes 210-220, and leaf nodes 222-228. According to the HACM, each object i is assigned to one leaf node of hierarchy 200 using the variable $I_{i\alpha}$. For example, leaf node 226 is shown in black as being assigned object i. Furthermore, for any object i assigned to a leaf node, such as node 226, the choices for generating levels for j objects are restricted to the active vertical path from the assigned leaf node to the root of the hierarchy. Moreover, all objects associated to an object i, designated as $n_i$ are generated from the same vertical path, with the variable $V_{ij\alpha\nu}$ controlling the choice of a node on the vertical path. For example, as shown in FIG. 2, object j may be chosen only from the path of nodes including nodes 210-216, which are lightly shaded in the figure, based on the variable $V_{ij\alpha\nu}$.

Figure 3:
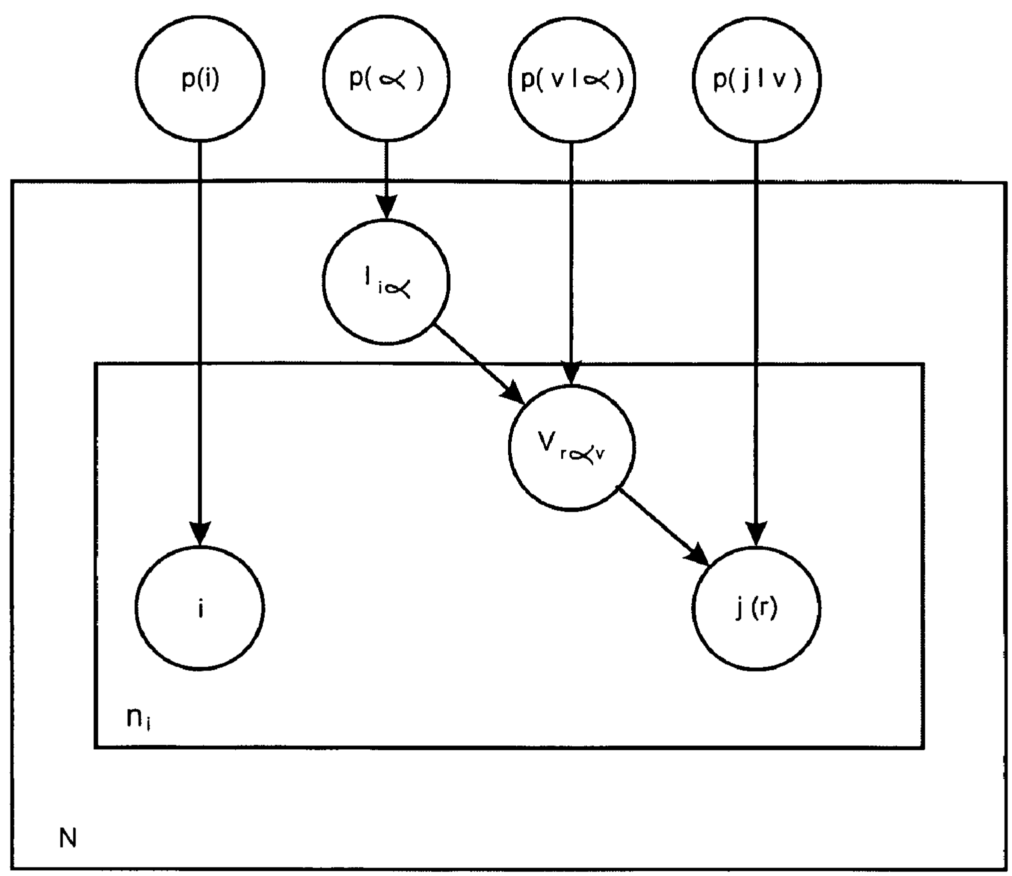
FIG. 3 illustrates a exemplary block diagram reflecting a model associated with a second hierarchical clustering model.

To further explain the HACM, FIG. 3 shows an exemplary representation of this model. The dependencies for the HACM, include observed and unobserved data. The HACM directly models the generation of a sample set $S_i$, which represents an empirical distribution $n_{j|i}$ over I (the set including object i), where $$n_{j|i} \equiv n_{ij} / n_i,\ n_i \equiv |S_i|, \text{ and } N \equiv \Sigma_i n_i.$$

As shown, the HACM allows i objects to be generated via the probability p(i), which depends on i. Furthermore, the generation of the j object of any couple (i(r),j(r)) such that i(r)=i is determined by a class α through $I_{i\alpha}$. Accordingly, it can be seen that the generation of the object j is dependent on i and the set of ancestors of α, through the variable $V_{r\alpha v}$.

The HACM is based on the following probability:

$$p(S_i \mid \alpha(i)) = \prod_{r:i(r)=i} p(i)p(v(r) \mid \alpha(i))p(j(r) \mid v(r)),$$

where α(i) reflects a class used to generate $S_i$ for a given i and v(r) reflects a class used to generate j(r), given α(i).

However, since there are exactly $n_i$ objects for which i(r)=i, and since $V_{r\alpha v}$ are binary valued, and equal to 0 for all but the (unknown) class v(r) used to generate j(r), $p(S_i|\alpha(i))$ may be rewritten as:

$$p(S_i \mid \alpha(i)) = p(i)^{ni} \prod_{r:i(r)=i} \sum_{v} V_{r\alpha(i)v} p(v \mid \alpha(i))p(j(r) \mid v).$$

The complete model formula for $p(S_i)$ may be obtained by summing on α(i), and may be written as:

$$p(S_i) = p(i)^{ni} \sum_{\alpha} I_{i\alpha} p(\alpha) \prod_{r:i(r)=i} \sum_{v} V_{r\alpha v} p(v \mid \alpha)p(j(r) \mid v)$$

Although the probability $p(S_i)$ presented above represents a simplified version of the HACM because v is conditioned only by α, and not by α and i (p(v|α, i)=p(v|α)), one skilled in the art would realize that the characteristics and operations of the HACM described herein apply to the complex version as well.

It should be noted that the product is taken over (i,j) pairs, where i is fixed. Accordingly, the product may be viewed as only being over j. From the above model, the formula for $p(S_i)$, which is the complete data log-likelihood $\mathcal{L}^c$, and may be represented as:

$$\mathcal{L}^c = \sum_i n_i \log p(i) + \sum_i \sum_\alpha I_{i\alpha} \log p(\alpha) + \sum_{i,j} n_{ij} \sum_\alpha I_{i\alpha} \sum_v V_{ij\alpha v} \log p(v \mid \alpha)p(j \mid v)$$

Another variant of deterministic annealing EM is described in L. D. Baker et al., "A Hierarchical Probabilistic Model for Novelty Detection in Text," Neural Information Processing Systems, 1998. The model described in Baker et al. may be referred to as a Hierarchical Markov Model (HMLM). Like the HACM, the HMLM directly models $p(S_i)$ based on the following formula:

$$p(S_i) = \sum_\alpha I_{i\alpha} p(\alpha) \prod_j \left( \sum_v V_{j\alpha v} p(v \mid \alpha)p(j \mid v) \right)_{ij}^{n}$$

The log-likelihood for complete data may be obtained for the HMLM from $p(S_i)$, and may be written as:

$$\mathcal{L}^c = \sum_i \sum_\alpha I_{i\alpha} \log p(\alpha) + \sum_{i,j} n_{ij} \sum_\alpha I_{i\alpha} \sum_v V_{j\alpha v} \log p(v \mid \alpha)p(j \mid v)$$

Figure 4:
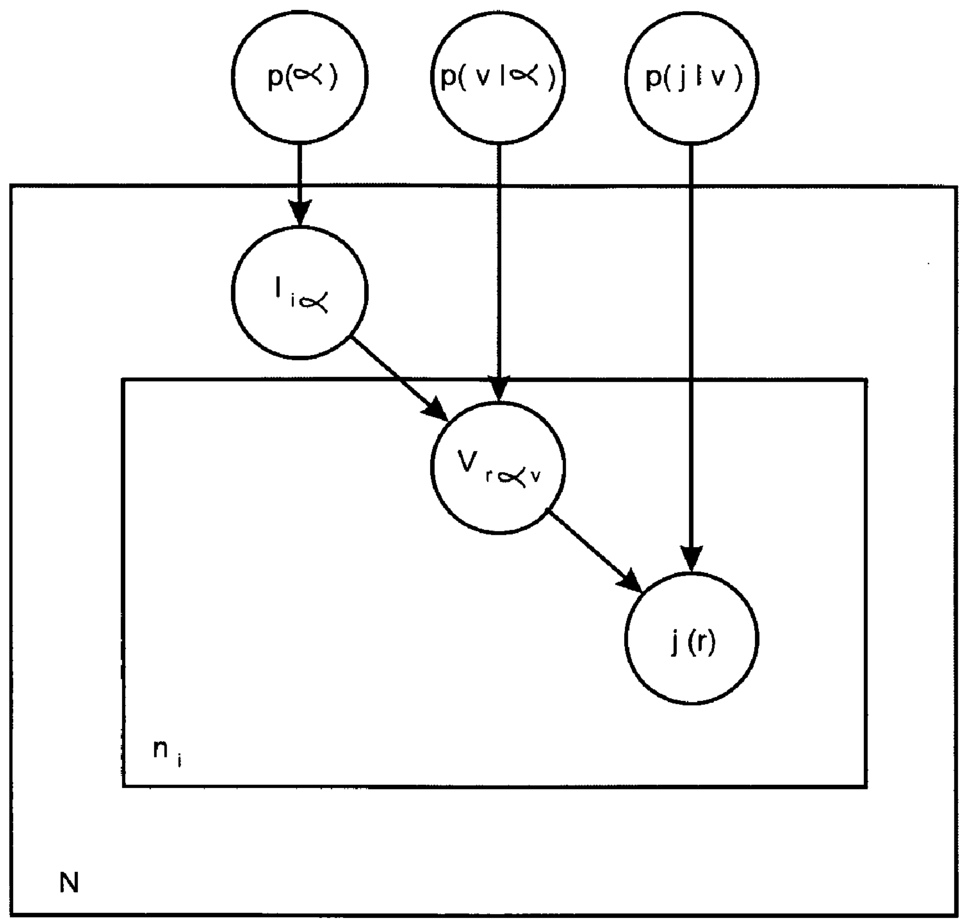
FIG. 4 illustrates an exemplary block diagram reflecting a third hierarchical clustering model.

FIG. 4 shows an exemplary representation of the HMLM. As shown, the only difference between the HACM and HMLM is that the prior probability p(i) of observing a set $S_i$ is not used in the HMLM. However, one skilled in the art would recognize that uniform prior probabilities for sets $S_i$ may be desired in certain applications, such as in text categorization where no preference is given over documents in a training set. In such a case, the difference between the HMLM and HACM mentioned above is removed.

Although the HACM and HMLM may provide soft hierarchical clustering of objects, it is important to keep in mind that these models may still result in hard assignments because of two properties associated with the models: First, the class α ranges only over leaves of the hierarchy, and the class v ranges only over the ancestors of α; and second, the contributions from objects j are directly collected in a product. The first property shows that objects i will only be assigned to the leaves of an induced hierarchy. For example, referring to FIG. 2, the HACM and HMLM will assign i objects to only nodes 224-230. The second property shows that, given an object i, all the j objects related to an object i have to be explained by the ancestors of the same leaf α. That is, if an object j related to i cannot be explained by any ancestor of α, then i cannot be assigned to α. Accordingly, this limitation on the assignment of i generally leads to a hard assignment of i and/or j objects in the induced hierarchy. Thus in text categorization systems, the implementation of the HACM and HMLM may lead to the creation of topics that are limited in granularity based on the hard assignment of documents and/or words of these documents to particular clusters.

Methods, systems, and articles of manufacture consistent with certain principles related to the present invention eliminates the reliance on leaf nodes alone, and allows any set $S_i$ to be explained by a combination of any leaves and/or ancestor nodes included in an induced hierarchy. That is, i objects may not be considered as blocks, but rather as pieces that may be assigned in a hierarchy based on any j objects they co-occur with. For example, in one configuration consistent with certain features and principles related to the present invention, a topical clustering application performed by computer 100 may assign parts of a document i to different nodes in an induced hierarchy for different words j included in the document i. This is in contrast to the HACM and HMLM where it is assumed that each document i is associated with the same leaf node in an hierarchy for all words j included in the document i.

One embodiment of the present invention may directly model the probability of observing any pair of co-occurring objects, such as documents and words (i,j), by defining a variable $I_{r\alpha}$ (controls the assignment of documents to the hierarchy) such that it is dependent on the particular document and word pair (i,j) under consideration during a topical clustering process. In one configuration consistent with certain principles related to the present invention, class α may range over all nodes in an induced hierarchy in order to assign a document (i object) to any node in the hierarchy, not just leaves. Furthermore, class v may be defined as any ancestor of α in the hierarchy. The constraint on v ensures that the nodes are hierarchically organized.

Figure 5:
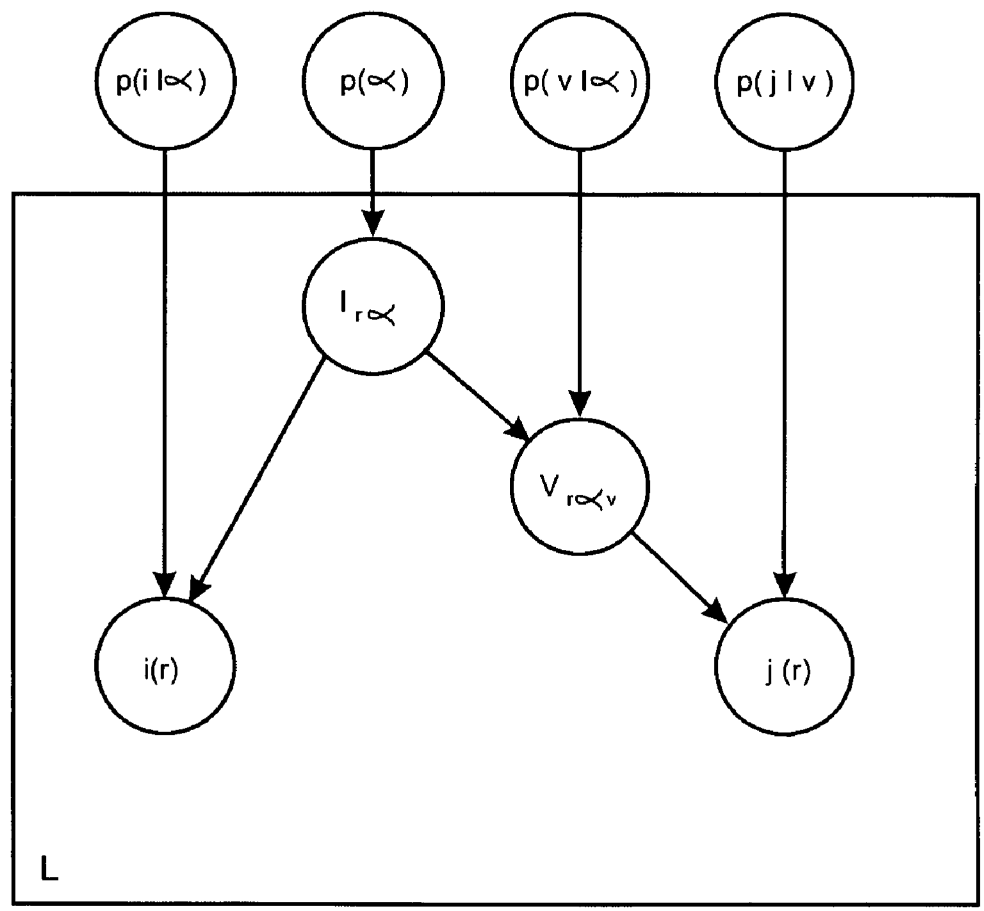
FIG. 5 illustrates exemplary block diagram associated with a hierarchical clustering model, consistent with certain features and principles related to the present invention.

FIG. 5 shows an exemplary representation of a model implemented by one embodiment of the present invention. One difference between the previously discussed models and one embodiment of the present invention is that in the present invention, the probability p(i(r),j(r)) is modeled rather than $p(S_i)$, as in the case of the HACM and HMLM:

$$p(i(r),\ j(r)) = \sum_\alpha I_{r\alpha} p(\alpha)p(i(r)|\alpha) \sum_v V_{r\alpha v}\, p(v|\alpha)p(j(r)|v)$$

An alternative formulation to the equation p(i(r),j(r)) is to replace p(α)p(i(r)|α) with p(i(r))p(α|i(r), both of which are equal to p(α,i(r)). Thus, the alternate equation would be:

$$p(i(r),\ j(r)) = \sum_{\alpha} I_{r\alpha}\, p(i(r))p(\alpha \mid i(r)) \sum_{v} V_{r\alpha v}\, p(v \mid \alpha)p(j(r) \mid v)$$

By workaround, the equal, alternative formulation could be used to achieve the same result as the original equation for p(i(r),j(r)).

To more clearly illustrate the differences between the previous models and the present invention, $p(S_i)$ may be derived for the present invention since $p(S_i)=\Pi_{r:i(r)=i}p(i(r),\ j(r))$. Therefore, $p(S_i)$ may be written as:

$$p(S_i) = \prod_{r:i(r)=i} \sum_{\alpha} I_{r\alpha}\, p(\alpha)p(i(r) \mid \alpha) \sum_{v} V_{r\alpha v}\, p(v \mid \alpha)p(j(r)|v)$$

The complete data log-likelihood may then be given by:

$$\mathcal{L}^c = \sum_{i,j}\sum_{\alpha} n_{ij} I_{ij\alpha} \log(p(\alpha)p(i \mid \alpha)) + \sum_{i,j}\sum_{\alpha}\sum_{v} n_{ij} I_{ij\alpha} V_{ij\alpha v} \log p(v \mid \alpha)p(j \mid v)$$

As can be seen from the derived formula for $p(S_i)$, the j objects, for a given α, are not collected in a product as in the case of the HACM and HMLM. Instead, the present invention determines the probability $p(S_i)$ such that the product is taken only after mixing over all the classes α. Thus, different j objects may be generated from different vertical paths of an induced hierarchy. That is, the paths in the hierarchy associated with non null values of $I_{i\alpha}$. The constraint in the HACM and HMLM that all j objects have to be generated from the same vertical paths in a hierarchy forces $I_{i\alpha}$ to have binary values. Methods, systems, and articles of manufacture that implement the model represented in FIG. 5 remove the constraint common to the HACM and HMLM, and all the instances of the hidden variable $I_{i\alpha}$ may obtain real values after re-estimation using a modified EM process as described below. Furthermore, because α may be any node in the hierarchy, the i objects may be assigned to different levels of the hierarchy. Accordingly, implementation of the model by methods depicted in FIG. 5 may result in a pure soft hierarchical clustering of both i and j objects by eliminating any hard assignments of these objects.

As mentioned previously, one embodiment of the present invention may perform a modified deterministic annealing EM process to implement the model shown in FIG. 5. In one configuration consistent with certain principles related to the present invention, Θ in the probability $p(x_r, y_r; \Theta))$ is associated with the current set of estimates given by the probability p(i(r),j(r)). Accordingly, the Q function consistent with features and principles of the present invention may be defined as:

$$Q_\beta(\Theta; \Theta^{(t)}) = \sum_i \sum_j n_{ij} \sum_{I_{ij}} \sum_{V_{ij\alpha}} \log(p(i,\ j;\ \Theta)) \frac{p(i,\ j;\ \Theta^{(t)})^\beta}{\sum_{I_{i\alpha}} \sum_{V_{ij\alpha}} p(i,\ j;\ \Theta^{(t)})^\beta},$$

-continued $$\text{with: } p(i,\ j;\ \Theta) = \sum_{\alpha} I_{ij\alpha}\, p(\alpha;\ \Theta)p(i|\alpha;\ \Theta) \sum_{v} V_{ij\alpha v}\, p(v|\alpha;\ \Theta)p(j|v;\ \Theta).$$

Methods, systems, and articles of manufacture consistent with features of the present invention may also implement a modified E and M step of the deterministic annealing EM process to determine the probabilities associated with the model shown in FIG. 5. For instance, because the E-Step process is directly derived from $Q_\beta$, and given an i, and $I_{i\alpha}$ equals zero for all but one α, and given i,j, and α, $V_{ij\alpha v}$ equals zero for all but one v, the Q function $Q_\beta(\Theta;\ \Theta^{(t)})$=A+B; where:

$$A = \sum_i \sum_j \sum_{I_{ij}} \sum_{V_{ij\alpha}} n_{ij} \sum_{\alpha} I_{ij\alpha} \log(p(\alpha;\ \Theta)p(i \mid \alpha;\ \Theta)) \frac{p(i,\ j;\ \Theta^{(t)})^\beta}{\sum_{I_{ij\alpha}} \sum_{V_{ij\alpha}} (p(i,\ j;\ \Theta^{(t)}))^\beta},$$

and $$B = \sum_i \sum_j \sum_{I_{ij}} \sum_{V_{ij\alpha}} n_{ij} \sum_{\alpha} \sum_{v} I_{ij\alpha} V_{ij\alpha v} \log(p(v|\alpha;\ \Theta)p(j|v;\ \Theta)) \frac{p(i,\ j;\ \Theta^{(t)})^\beta}{\sum_{I_{ij\alpha}} \sum_{V_{ij\alpha}} p(i,\ j;\ \Theta^{(t)})^\beta}.$$

However, because $$\sum_{I_{ij}} \sum_{V_{ij\alpha}} I_{ij\alpha}\, p(i,\ j;\ \Theta^{(t)})^\beta = p(\alpha;\ \Theta^{(t)})^\beta p(i|\alpha;\ \Theta^{(t)})^\beta \sum_{v} p(v|\alpha;\ \Theta^{(t)})^\beta p(j|v;\ \Theta^{(t)})^\beta,$$

A in the equation above may be defined as:

$$A = \sum_i \sum_j \sum_{\alpha} n_{ij} < I_{ij\alpha} >_\beta \log(p(\alpha;\ \Theta)p(i \mid \alpha;\ \Theta)), \text{ where}$$

$$< I_{ij\alpha} >_\beta = \frac{p(\alpha;\ \Theta^{(t)})^\beta p(i \mid \alpha;\ \Theta^{(t)})^\beta \sum_v p(v \mid \alpha;\ \Theta^{(t)})^\beta p(j \mid v;\ \Theta^{(t)})\beta}{\sum_\alpha p(\alpha;\ \Theta^{(t)})^\beta p(i \mid \alpha;\ \Theta^{(t)})^\beta \sum_v p(v \mid \alpha;\ \Theta^{(t)})^\beta p(j \mid v;\ \Theta^{(t)})^\beta}.$$

Similar to the determination of A, B may be obtained in the following form:

$$B = \sum_i \sum_j \sum_{\alpha} \sum_{v} n_{ij} < I_{ij\alpha} V_{ij\alpha v} >_\beta \log(p(v \mid \alpha;\ \Theta)p(j \mid v;\ \Theta)), \quad \text{where}$$

$$< I_{ij\alpha} V_{ij\alpha v} >_\beta = \frac{p(\alpha;\ \Theta^{(t)})^\beta p(i \mid \alpha;\ \Theta^{(t)})^\beta p(v \mid \alpha;\ \Theta^{(t)})^\beta p(j \mid v;\ \Theta^{(t)})^\beta}{\sum_\alpha p(\alpha;\ \Theta^{(t)})^\beta p(i \mid \alpha;\ \Theta^{(t)})^\beta \sum_v p(v \mid \alpha;\ \Theta^{(t)})^\beta p(j \mid v;\ \Theta^{(t)})^\beta}.$$

As described, $<I_{ij\alpha}>_\beta$ and $<I_{ij\alpha}V_{ij\alpha v}>_\beta$ correspond to the E-step process of the modified deterministic annealing EM process consistent with certain principles related to the present invention. Moreover, $<I_{ij\alpha}V_{ij\alpha v}>_\beta$ corresponds to the assignment to any ancestor in the induced hierarchy given $\alpha$.

The modified M-step process performed by one embodiment of the present invention aims at finding the parameter the parameter $\Theta$ which maximizes $Q_\beta(\Theta; \Theta^{(t)})$. Inherent in such probability distributions is the constrained optimization restriction associated with the constraints having the form:

$$\sum_x p(x; \Theta) = 1.$$

In one configuration consistent with certain principles related to the present invention, Lagrange multipliers may be used to search for the corresponding unconstrained maximum. For example, to derive the probability $p(\alpha)$ implemented in the model shown in FIG. 5, Lagrange multipliers are introduced to find $p(x; \Theta)$ such that:

$$\frac{\delta}{\delta p(\alpha; \Theta)}\left(Q_\beta(\Theta; \Theta^{(t)}) - \lambda \sum_\alpha p(\alpha; \Theta)\right) = 0$$

which, by making use of the constraint $$\sum_x p(\alpha; \Theta) = 1,$$

results in:

$$p(\alpha; \Theta) = \frac{1}{N}\sum_{i,j} < I_{ij\alpha} >_\beta .$$

Using the same principle as above, the remaining probabilities implemented in the model shown in FIG. 5 may be derived, which results in the following:

$$p(i \mid \alpha; \Theta) = \frac{\sum_i < I_{ij\alpha} >_\beta}{\sum_{i,j} < I_{ij\alpha} >_\beta},$$

$$p(v \mid \alpha; \Theta) = \frac{\sum_{i,j} n_{ij} < I_{ij\alpha} V_{tj\alpha v} >_\beta}{\sum_{i,j}\sum_v n_{ij} < I_{ij\alpha} V_{tj\alpha v} >_\beta}, \text{ and}$$

$$p(j \mid v; \Theta) = \frac{\sum_i \sum_\alpha n_{ij} < I_{ij\alpha} V_{ij\alpha v} >_\beta}{\sum_{i,j}\sum_\alpha n_{ij} < I_{ij\alpha} V_{ij\alpha v} >_\beta}.$$

As described, the probabilities $p(\alpha; \Theta)$, $p(i|\alpha; \Theta)$, $p(v|\alpha; \Theta)$, and $p(j|v; \Theta)$ define the M-step re-estimation processes used in the modified deterministic annealing EM process implemented by the present invention.

Methods, systems, and articles of manufacturer consistent with certain principles related to the present invention may be configured to implement the model depicted in FIG. 5 for a variety of applications, depending upon the meaning given to objects i and j. One such configuration may be applied to document clustering based on topic detection. In such a configuration, i objects may represent documents and j objects may represent words included in the documents, and clusters and/or topics of documents are given by leaves and/or nodes of an induced hierarchy. The topics associated with the document collection may be obtained by interpreting any cluster as a topic defined by the word probability distributions, $p(j|v)$ shown in FIG. 5. The soft hierarchical model consistent with certain principles related to the present invention may take into account several properties when interpreting the clusters, such as: (1) a document may cover (or be explained by) several topics (soft assignment of i objects provided by $p(i|\alpha)$); (2) a topic is best described by a set of words, which may belong to different topics due to polysemy (the property of a word to exhibit several different, but related meanings) and specialization (soft assignment of j objects provided by $p(j|v)$); and (3) topics may be hierarchically organized, which corresponds to the hierarchy induced over clusters. In one configuration consistent with certain principles related to the present invention, the general probabilistic model for hierarchies may process document collections in which topics cannot be hierarchically organized (i.e., flat models). In this instance, the probabilities $p(v|\alpha)$ are concentrated on $v=\alpha$ which results in a flat set of topics rather than a hierarchy.

Figure 6:
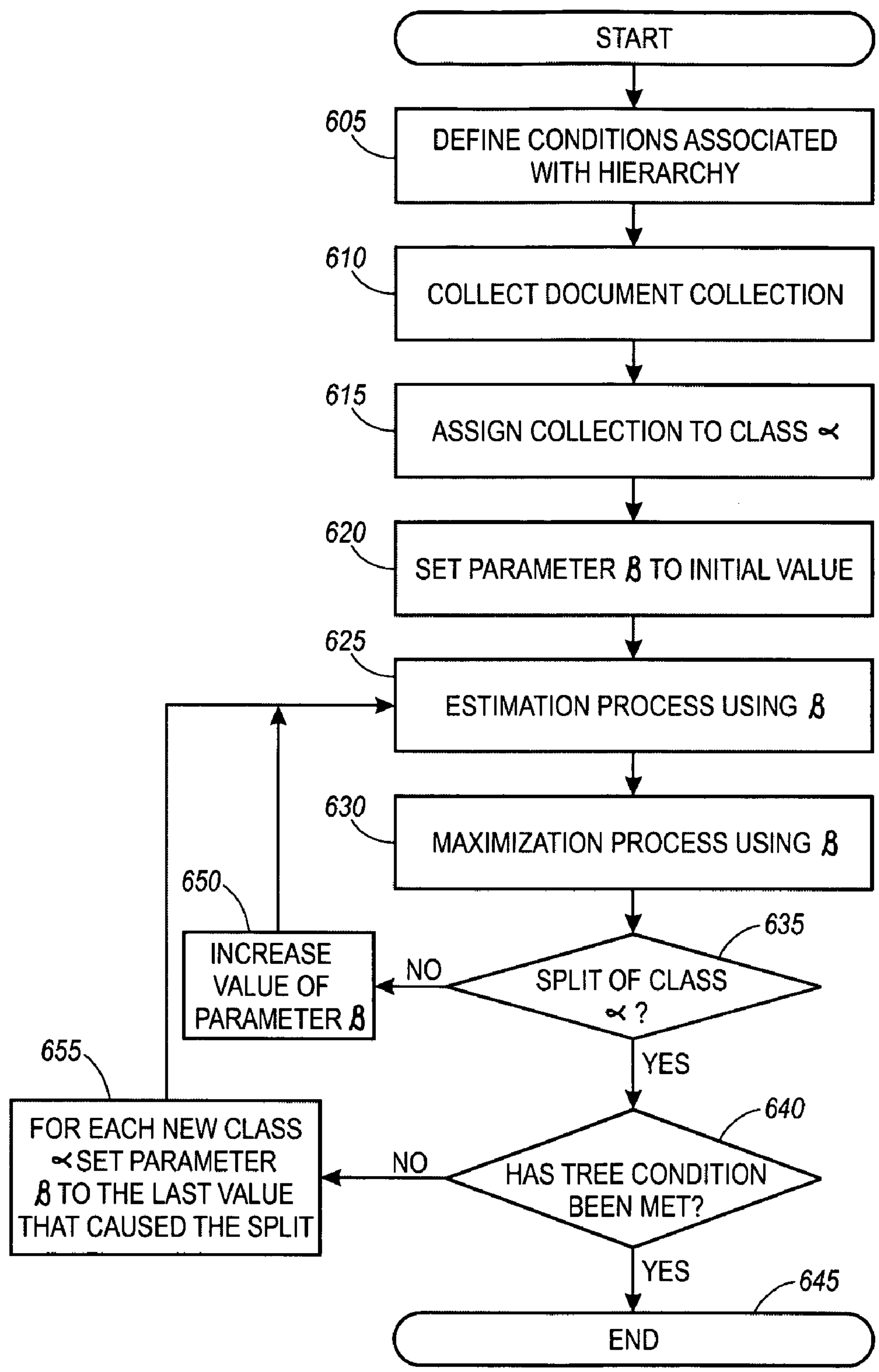
FIG. 6 illustrates a flowchart of an exemplary process that may be performed by methods, systems, and articles of manufacture, consistent with certain features and principles related to the present invention.

FIG. 6 shows a flowchart reflecting an exemplary document clustering process that may be performed by one embodiment of the present invention. In one configuration consistent with certain principles related to the present invention, computer 100 may be configured to cluster documents by identifying topics covered by a set, or collection, of documents (i objects), where each document may include a plurality of words (j objects). Computer 100 may perform the clustering features consistent with certain principles related to the present invention based on a request from a requesting entity. The requesting entity may be a user interacting with computer 100 through the input/output components associated with the computing system in FIG. 1, or may be a user remotely located from computer 100. A remote user may interact with computer 100 from a remote location, for example another computing system connected to a network, using network connector 114. Furthermore, the requesting entity may be a process or a computing entity that requests the services of computer 100. For example, a requesting entity may be associated with another computing system (located remotely via a network, or locally connected to bus 108) that requests a clustering operation associated with a document collection. For instance, a server that provides search operations associated with document collections may request computer 100 to determine the topics of a particular document collection. In this example, computer 100 may receive a request to cluster a document collection and make the results of the clustering operation available to the requesting entity. It should be noted that one skilled in the art would recognize that a number of different types of requesting entities, and types of requests, may be implemented without departing from the spirit and scope of the present invention.

A document collection may be located in any of the memories, 104, 106, and 114. Also, a document collection may be located remote from the computing environment shown in FIG. 1, such as on a server connected to network. In such an instance, computer 100 may be configured to receive the collection through network connector 114. One skilled in the art would recognize that the location of the document collection is not limited to the examples above, and computer 100 maybe configured to obtain access to these locations using methods and systems known in the art.

Referring to FIG. 6, in one configuration consistent with certain principles related to the present invention, computer 100 may begin clustering techniques consistent with certain principles related to the present invention by defining one or more conditions associated with a hierarchy (tree) that may be induced (Step 605). The conditions may allow computer 100 to determine when an induced hierarchy reaches a desired structure with respect to the clusters defined therein. For example, a condition may be defined that instructs processor 102 (that may be executing instructions and/or program code to implement the soft hierarchical model consistent with features of the present invention) to stop locating co-occurring objects (i,j) in a document collection that is being clustered. Such a condition may be based on a predetermined number of leaves, and/or a level of the induced hierarchy. In one configuration consistent with certain principles related to the present invention, computer 100 may receive the conditions from a user through an input/output device, such as keyboard 110. For example, a user may be prompted by computer 100 to provide a condition, or computer 100 may be instructed by the user to determine the conditions autonomously, based on the size of the document collection. One skilled in the art would recognize that a number of other conditions may be implemented without departing from the spirit and scope of the present invention.

Referring back to FIG. 6, once one or more conditions have been defined, computer 100 may receive (or retrieve) a document collection that is targeted for clustering (Step 610). Once the collection is accessible by computer 100, processor 102 may assign the entire document collection to a class $\alpha$ (Step 618). Initially, class $\alpha$ may represent a root node or cluster representing a main topic or topics associated with the document collection. Also, processor 102 may also set a parameter $\beta$ to an initial value (Step 620). In one embodiment, the parameter $\beta$ may be a value that controls the complexity of an objective function to optimize through the number of clusters and the computation of the parameter value itself. The initial value of $\beta$ may be a very low value (i.e., 0.01), for which only one cluster is required to find the unique maximum of the objective function, and range up to 1. The value of $\beta$ may be determined autonomously by processor 102 based on the size of the collection, or may also be provided by a user through an input/output device such as keyboard 110.

Next, processor 102 may perform the modified E-step in the modified deterministic annealing EM process consistent with certain principles related to the present invention (Step 625). Accordingly, $Q_\beta(\Theta; \Theta^{(t)})$ may be computed according to the formulas described defined above consistent with features and principles related to the present invention (i.e., $Q_\beta(\Theta; \Theta^{(t)})=A+B$), given the class $\alpha$ and the defined value of parameter $\beta$.

Processor 102 may also perform the maximization process given the class $\alpha$ and the defined value of parameter $\beta$ in accordance with certain principles related to the present invention (Step 630). That is, the probability distributions $p(\alpha; \Theta)$, $p(i|\alpha; \Theta)$, $p(v|\alpha; \Theta)$, and $p(j|v; \Theta)$ are determined. Once the modified deterministic annealing EM process consistent with certain principles related to the present invention is performed, processor 102 may determine whether the class $\alpha$ has split into two child classes (Step 635).

In one configuration consistent with certain principles related to the present invention, processor 102 may recognize a split of class $\alpha$ based on the probability distribution $p(i|\alpha)$. Initially, when the parameter $\beta$ is set to a very low value, all documents and words (i and j) included in the document collection have the same probability of being assigned to class $\alpha$. However, as the value of the parameter $\beta$ increases, the same probability associated with different documents based on different words included in these documents begin to diverge from each other. This divergence may result in two classes (or clusters) of documents being realized from an ancestor class, whereby each child class includes documents that have a similar probability $p(i|\alpha)$ value based on different words included in each respective document. For example, suppose the document collection that is initially assigned to class $\alpha$ in Step 615 includes document DOC1, containing words W1, W2, and W3, and document DOC2 containing words W4, W5, and W6. This initial class $\alpha$ including DOC1 and DOC2 may produce the same probability $p(i|\alpha)$ for each document in the collection at an initial value of parameter $\beta$ based on the words in each respective document. However, at a higher value of $\beta$, the same class $\alpha$ may result in a first probability $p(i|\alpha)$ associated with DOC1 based on W1, and a second probability for DOC1 based on W2. Similarly at the higher value of $\beta$, DOC2 may be associated with the first probability based on W4, W5, and W6. It should be noted that in accordance with certain principles related to the present invention, a single document, such as DOC1, may be assigned to two classes (or clusters) based on the words included within the single document.

In Step 635, processor 102 may be configured to determine whether the probability $p(i|\alpha)$ associated with each document in the collection is the same, or falls into one of two probability values corresponding to the rest of the documents in the collection. In the event processor 102 determines that there has been a split of the class $\alpha$ (Step 635; YES), it may determine whether the conditions defined in Step 605 have been met (Step 640). At this stage in the process, a hierarchy is being induced (i.e., the split of class $\alpha$ into two child classes). Accordingly, if processor 102 determines that a condition (e.g., a maximum number of leaves) has been met (Step 640; YES), the induced hierarchy has been completed, and the documents have been clustered based on the topics associated with the words included in each document, and the clustering process ends (Step 645).

If processor 102 determines that the initial class $\alpha$ has not split at the current value of parameter $\beta$ (Step 635; NO), the value of the parameter $\beta$ may be increased (Step 650), and the process returns to Step 625 using the increased value of parameter $\beta$. The manner in which the parameter $\beta$ is increased may be controlled using a step value, which may be predetermined by a user or computed from the initial value of the parameter $\beta$ and additional parameters provided by the user (i.e., the number of clusters, the depth of the hierarchy, etc.). Furthermore, in the event that the initial class $\alpha$ has split into two child classes (each of which is defined as a separate class $\alpha$) (Step 635; YES), but the conditions of the hierarchy have not been met (Step 640; NO), processor 102 may set the parameter $\beta$ for each new child class $\alpha$ to the value that caused the initial class $\alpha$ to split (Step 655). Processor 102 may then perform the same steps for each new child class $\alpha$ (Steps 625-655) until the conditions of the hierarchy have been met (Step 640; YES), and the clustering process ends (Step 645).

In one configuration consistent with certain principles related to the present invention, the end of the cluster process (Step 645) may be proceeded by the creation of a representation associated with the induced hierarchy by computer 100 and may be stored in a memory (i.e., memories 106, 104, and/or 116). The representation may reflect the topics associated with the clustered document collection, and may be created in a variety of forms, such as, but not limited to, one or more tables, lists, charts, graphical representations of the hierarchy and/or clusters, and any other type of representation that reflects the induced hierarchy and the clusters associated with topics of the document collection. Computer 100 may make the stored representation available to a requesting entity, as previously described, in response to a request to perform a clustering operation (i.e., determine topics of a document collection). The representation may be made available to an entity via the network connector 114, or bus 108, and may be sent by computer 100 or retrieved by the entity. Additionally, computer 100 may be configured to send the representation of the hierarchy to a memory (such as a database) for retrieval and/or use by a entity. For example, a server located remotely from computer 100 may access a database that contains one or more representations associated with one or more hierarchies provided by computer 100. The hierarchies may include clusters of topics associated with the one or more document collections. For example, the server may access the database to process a search operation on a particular document collection. In another embodiment consistent with certain principles related to the present invention, computer 100 may make the representation available to a user through display 112. In this configuration, computer 100 may create a graphical representation reflecting the induced hierarchy and the topics reflected by the hierarchy's clusters, and provide the representation to display 112 for viewing by a user.

Figure 7:
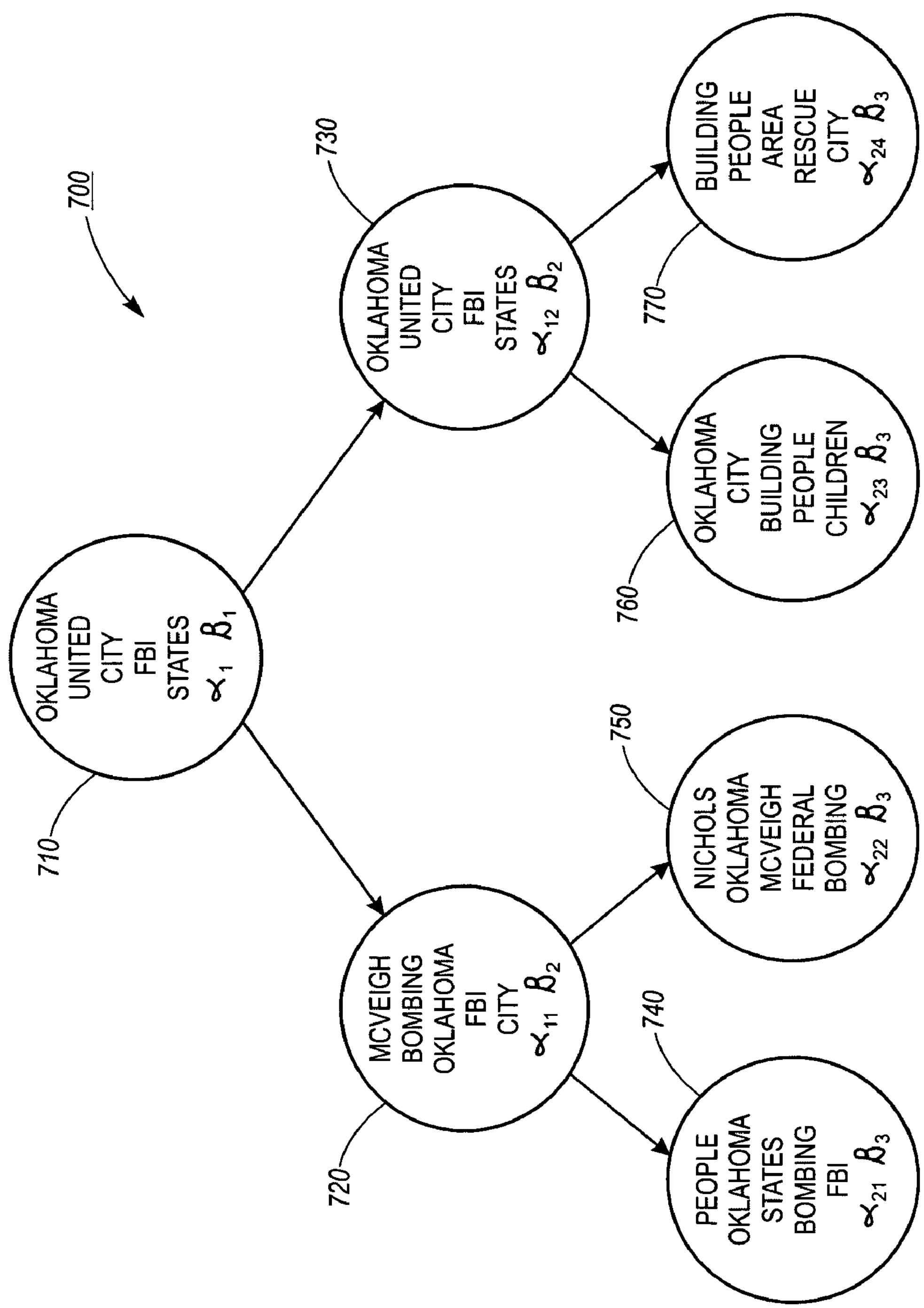
FIG. 7 illustrates an exemplary topical hierarchy associated with a document collection that may be produced by methods, systems, and articles of manufacture consistent with certain features related to the present invention.

To further describe certain configurations consistent with the present invention, FIG. 7 shows an exemplary topic hierarchy 700 for an exemplary document collection that may be created by the present invention. Hierarchy 700 may reflect a document collection including a certain number of documents (i.e., 273 separate documents) associated with news articles related to the Oklahoma City bombing. In this example, the documents may contain 7684 different non-empty words. Empty words may reflect words such as determiners, prepositions, etc., and may have been removed from the collection using techniques known in the art, such as a stop list. Prior to generating hierarchy 700, processor 102 may have defined a hierarchy condition reflecting a maximum of four leaves for the induced hierarchy 700.

As shown, hierarchy 700 includes seven nodes (710-770), and four leaves (740-770). Each node may be associated with the first five words in the collection for which p(j|v) is the highest. During the generation of hierarchy 700 by the present invention, the document collection associated with node 710 (defined within class $\alpha_1$ with parameter $\beta_1$) may have been separated into two child topic/clusters when a split of class $\alpha_1$ was determined following the increase of the value of parameter $\beta_1$. In exemplary hierarchy 700, the two child topic/clusters are associated with nodes 720 and 730, defined by classes $\alpha_{11}$ and $\alpha_{12}$, respectively, and the split of class $\alpha_1$ may have occurred at a parameter value of $\beta_2$.

During subsequent generation, each class $\alpha_{11}$ and $\alpha_{12}$, may have split into two child topics/clusters when the value of parameter was increased from $\beta_2$ to $\beta_3$. As shown, node 720, defined by class $\alpha_{11}$, may have split into nodes 740 and 750, defined by classes $\alpha_{21}$ and $\alpha_{22}$, respectively. Node 730 defined by class $\alpha_{12}$, on the other hand, may have split into nodes 760 and 770, defined by classes $\alpha_{23}$ and $\alpha_{24}$, respectively.

As can be seen in FIG. 7, the present invention may cluster the exemplary document collection into selected topics based on the co-occurrence of (document, word) pairs. For example, in hierarchy 700, Node 720 may reflect a topic/cluster related to the investigation of the bombing, while node 730 may reflect a topic/cluster associated with the bombing event itself. Node 720 may split into two more topics related to the investigation itself (Node 740), and the trial associated with the bombing (Node 750). Node 730, on the other hand, may have been split into two topics related to the description of the bombing and casualties (Node 760), and the work of the rescue teams at the bomb site (Node 770). In the exemplary hierarchy 700, upper level nodes were used to describe a given topic, through p(v|α) and p(j|v). Accordingly, words that appear frequently in all documents of the collection, such as "Oklahoma," are best explained by assigning them to a lot of topic/clusters in hierarchy 700.

It should be noted that in one embodiment, the "title" of the topics associated with each cluster/node of hierarchy 700 may be provided by a user. For instance, the user may be provided with the N most probable words associated with each cluster/node. From these words, the user may then infer a "title" for the cluster/node which is associated with a topic. Alternatively, the "title" for each cluster/node may be determined automatically by processor 102. In this configuration, processor 102 may extract the most frequent n-grams from the documents associated with a particular cluster/node, and determine a "title" for the cluster/node based on the extracted n-grams.

In one configuration consistent with certain principles related to the present invention, computer 100 may be configured to evaluate the adequacy of a topical hierarchy induced by one embodiment of the present invention. In this configuration, processor 102 may execute instructions or program code that allow the clusters included in an induced hierarchy based on a test document collection, to be compared to a set of manual labels previously assigned to the test collection. To perform this evaluation, processor 102 may use the average of the Gini function over the labels and clusters included in the induced hierarchy, and may be defined as:

$$G_l = \frac{1}{L}\sum_{l}\sum_{\alpha}\sum_{\alpha'\neq\alpha} p(\alpha\mid l)p(\alpha'\mid l);\quad \text{and}$$

$$G_\alpha = \frac{1}{\Lambda}\sum_{\alpha}\sum_{l}\sum_{l'\neq l} p(l\mid\alpha)p(l'\mid\alpha).$$

In the above Gini functions, L reflects the number of different labels and Λ reflects the number of different clusters. Additionally, $G_l$ measures the impurity of the obtained clusters α with respect to the labels l, and reciprocally for $G_\alpha$. Smaller values of the Gini functions $G_l$ and $G_\alpha$ indicate better results because clusters and labels are in closer correspondence. That is, if data clusters and label clusters contain the same documents with the same weights, the Gini index is 0. The Gini functions $G_l$ and $G_\alpha$ each have an upper bound of 1.

Accordingly, when computer system 100 seeks to evaluate the effectiveness of the soft hierarchical clustering operations consistent with certain principles related to the present invention, a test document collection may be accessed and the process shown in FIG. 6 performed on the collection to produce a topic hierarchy. The results of performing the Gini functions on the clusters may be provided in the form of Gini indexes. Processor 102 may be configured to analyze the resultant Gini function to determine whether the clustering process consistent with features of the present invention is producing proper topical results.

In one configuration consistent with certain principles related to the present invention, the Gini indexes associated with the process shown in FIG. 6 may be compared to Gini indexes associated with other clustering processes, such as the HMLM and flat clustering models that assign documents only to leaves of an induced hierarchy, such as the Separable Mixture Model (SMM). For example, Table 1 shows an exemplary Gini index table associated with a test document collection that may have been clustered by processor 102 using the soft hierarchical clustering process consistent with features of the present invention, a clustering process based on the HMLM, and a SMM clustering process. As shown in Table 1, the Gini indexes associated with the soft hierarchical clustering process consistent with features of the present invention are lower than those associated with the other two models (HMLM, and the labels). Such results may give computer system 100 an indication of the effectiveness of the topic clusters generated by performing the clustering process consistent with certain principles related to the present invention, as compared to other clustering processes.

TABLE 1

Gini Index Comparisons

| | $G_I$ | $G_\alpha$ |
|---|---|---|
| SMM | 0.34 | 0.30 |
| HMLM | 0.40 | 0.45 |
| Model consistent with certain principles related to the present invention | 0.20 | 0.16 |

As described, the present invention enables a computing system to produce topic clusters from a collection of documents and words, such that each cluster may be associated with documents that are assigned to other clusters. Accordingly, the hard assignment of objects in an induced hierarchy of clusters is eliminated.

It should be noted that the present invention is not limited to the implementations and configurations described above. One skilled in the art would recognize that a number of different architectures, programming languages, and other software and hardware combinations may be utilized without departing from the scope of the present invention.

Moreover, it should be noted that the sequence of steps illustrated in FIG. 6 are not intended to be limiting. That is, certain steps shown in FIG. 6 may be performed concurrently or in a different sequence than that shown in the figure without departing form the scope of the invention. For example, the present invention may access a document collection prior to defining conditions associated with a hierarchy to be induced. Also, the present invention is not limited to clustering based on documents and words. For example the i objects may be defined as nouns and the j objects as modifying nouns in a document collection. Furthermore, the soft hierarchical clustering model implemented by the present invention may be applied to applications outside of the document clustering environment.

Moreover, the present invention may allow a hierarchy of topic clusters associated with a document collection to be updated based on a new document (or documents) added to the collection. In this configuration, computer 100 may allow a document collection to be updated with the addition of one or more new documents, and perform a clustering operation consistent with certain principles related to the present invention on the modified collection. Accordingly, the present invention may be implemented to modify a topic hierarchy associated with a document collection, each time a new document (or a set of documents) is added to the collection.

Furthermore, the present invention may be employed for clustering users based on the actions they perform on a collection of documents (e.g., write, print, browse). In this configuration, the "i" objects would represent the users and the "j" objects would represent the documents. Additionally, the present invention may be employed for clustering images based on text that is associated with the images. For example, the associated text may reflect a title of the image or may be text surrounding the image such as in a web page. In this configuration, the "i" objects would represent the images and the "j" objects would represent the words contained in the title of each image. Also, the present invention may be employed to cluster companies based on their activity domain or consumer relationships. For example, in the latter application, the "i" objects would represent the companies and the "j" objects would represent a relation between the companies and their consumers (e.g., "sells to"). That is, one or more business entities may have a set of customer who purchased different types of products and/or services from the business entities. Accordingly, in accordance with certain aspects of the present invention, the clusters of a hierarchy may represent groups of customers who purchased similar types of products and/or services from the business entities (e.g., buys hardware, buys computer software, buys router parts, etc.). Therefore, in this configuration, "i" may represent the customers and "j" may represent the business entities. Alternatively, another configuration may include a set of customers who purchase various types of products and/or services from particular types of business entities. In this configuration, the clusters of the hierarchy may represent groups of product and/or service types (e.g., sells hardware, sells computer software, sells paper products, etc.) In this configuration, "i" may represent the business entities and "j" may represent the customers. Accordingly, one skilled in the art would realize that the present invention may be applied to the clustering of any type of co-occurring objects.

Additionally, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described aspects of the invention, but instead is defined by the appended claims in light of their full scope of equivalents.

What is claimed is:

1. A method performed by a computer for clustering a plurality of documents in a structure comprised of a plurality of clusters hierarchically organized, wherein each document includes a plurality of words and is represented as a set of (document, word) pairs, the method comprising:

accessing the document collection;

performing a clustering process that creates a hierarchy of clusters that reflects a segregation of the documents in the collection based on the words included in the documents, wherein a document in the collection is assigned to a first cluster in the hierarchy based on a first segment of the respective document, and the respective document is assigned to a second cluster in the hierarchy based on a second segment of the respective document, wherein the first and second clusters are associated with different paths of the hierarchy comprising the steps:

assigning the document collection to a first class;

setting a probability parameter to an initial value;

determining, for each document in the collection at the value of the parameter, a probability of an assignment of the document in the collection to a cluster in the hierarchy based on a word included in the document and the first class;

determining whether the first class has split into two child classes, wherein each child class reflects a cluster descendant from an initial cluster reflected by the first class; and increasing the value of the parameter based on the determination whether the first class has split into two child classes, storing a representation of the hierarchy of clusters in a memory; and making the representation available to an entity in response to a request associated with the document collection.

2. The method of claim 1, further comprising:

repeating the step of determining, for each document in the collection at the value of the parameter, and the step of increasing the value of the parameter until the first class has split into two child classes.

3. The method of claim 2, further comprising:

performing the clustering process for each child class until each of the respective child class splits into two new child classes reflecting clusters descendant from the respective child class.

4. The method of claim 3, further comprising:

repeating the clustering process for each new child class such that a hierarchy of clusters is created, until a predetermined condition associated with the hierarchy is met.

5. The method of claim 4, wherein the predetermined condition is one of a maximum number of leaves associated with the hierarchy and depth level of the hierarchy.

6. The method of claim 1 wherein the representation defines the probability of a document as the product of the probability of the (document, word) pairs it contains.

7. The method of claim 6, wherein the product is calculated after mixing the document-word pairs over the clusters.

8. The method of claim 7, wherein mixing the (document, word) pairs over the clusters comprises a probability model of the form:

$$P(x) = \sum_{c} P(c)P(x \mid c)$$

wherein c is the group of clusters involved in the calculation, and x is a (document, word) pair.

9. A method performed by a computer for determining topics of a document collection, the method comprising:

accessing the document collection, each document including a plurality of words and being represented as a set of (document, word) pairs;

performing a clustering process including:

creating a tree of nodes that represent topics associated with the document collection based on the words in the document collection, wherein at least one node in the tree includes a word that is shared by another node in the tree, and assigning fragments of one or more documents included in the document collection to multiple nodes in the tree based on the (document, word) pairs comprising:

associating a set of documents in the document collection with a first class reflecting all of the nodes in the tree, wherein the set of documents may include all or some of the documents in the collection;

defining a second class reflecting any ancestor node of a node in the first class;

determining, for each document in the set, a probability that different words included in a respective document co-occurs with the respective document in any node in the tree based on the first and second classes; and assigning one or more fragments of any document in the set to any node in the tree based on the probability;

storing a representation of the tree in a memory; and making the representation available for processing operations associated with the document collection.

10. A computer program product, comprising a computer usable medium having a computer readable program code embodied therein, the computer readable program code adapted to be executed by a computer to implement a method for clustering data in a database, the method comprising:

receiving a collection of documents, each document including a plurality of words and being represented as a set of (document, word) pairs;

creating a first ancestor node reflecting a first topic based on words included in the collection of documents;

creating descendant nodes from the first ancestor node, each descendant node reflecting descendant topics based on the first node, until a set of leaf nodes reflecting leaf topics are created, wherein creating descendant nodes includes:

assigning each document in the collection to a plurality of descendant and leaf nodes; and providing a set of topics associated with the collection of documents based on the created nodes and assignment of documents, wherein the descendant and leaf nodes may be created based on one or more words included in more than one document in the collection of documents, and wherein a probability of observing any pair of co-occurring objects represented as the set of (document,word) pairs, the document of the pairs being (i) and the words being (j), is modeled by defining a variable $I_{r\alpha}$ which controls assignment of documents to the hierarchy, such that it is dependent on a particular (document,word) pair (i,j) under consideration during a topical clustering process, and a class a ranges over all nodes in an induced hierarchy in order to assign a document (i object) to any node in the hierarchy, not just leaf nodes, and a class v is defined as an ancestor of $\alpha$ in the hierarchy, the constraint on v ensuring that the nodes are hierarchically organized.

11. The computer program product of claim 10, wherein the step of creating descendant nodes comprises:

selecting a first document in the collection; defining a first class that includes all of the nodes;

defining a second class that may include any ancestor node of any node included in the first class; and determining, for each document in the collection, a target word of an object pair including a target document and the target word such that the first document equals the target document in the object pair based on a probability associated with the first and second classes; and assigning the first document to any ancestor, descendant, and leaf node based on the determining.

12. A computer program product, comprising a computer usable medium having a computer readable program code embodied therein, the computer readable program code adapted to be executed by a computer to implement a method for clustering data in a database, the method comprising:

receiving a collection of documents, each document including a plurality of words and being represented as a set of (document, word) pairs, the document of the pairs being (i) and the words of the pairs being (j);

creating a hierarchy of nodes based on the words in the collection of documents, each node reflecting a topic associated with the documents, wherein the hierarchy of nodes includes ancestor nodes, descendant nodes, and leaf nodes;

assigning each document in the collection to a plurality of nodes in the hierarchy, wherein each document has the ability to be assigned to any of the ancestor, descendant, and leaf nodes; and providing a set of topic clusters associated with the collection of documents based on the created nodes and assignment of documents, wherein the hierarchy may include a plurality of nodes that are each created based on a same set of words included in the collection of documents, wherein in the foregoing steps, the (j) objects, for a given $\alpha$, are not collected in a product, rather a probability is determined such that the product is taken only after mixing over all classes $\alpha$, thus, different j objects are generated from different vertical paths of an induced hierarchy, that is, the paths in the hierarchy associated with non-null values of $I_{i\alpha}$, and all the instances of the hidden variable $I_{i\alpha}$ obtain real values after a re-estimation using a modified EM process, and wherein as a is able to be any node in the hierarchy, the (i) objects are able to be assigned to different levels of the hierarchy, accordingly, implementation of the model results in a pure soft hierarchical clustering of both (i) and (j) objects by eliminating any hard assignments of these objects.

13. A method performed by a computer for clustering data stored on a computer-readable medium, the method comprising:

receiving a collection of data objects, represented as a set of (first data object, second data object) pairs, the document of the pairs being (i) and the words of the pairs being (j);

for each first data object:

assigning the first data object to a first node in a hierarchy of nodes based on the second data objects included in the first data object, wherein the first node is any node included in the hierarchy and wherein two or more nodes in the hierarchy share the same second object;

creating a final hierarchy of nodes by successively splitting ancestor nodes arranged in clusters based on the assignment of the first data objects;

storing a representation of the final hierarchy in a memory; and making the representation of the final hierarchy available to an entity in response to a request associated with the collection of first data objects, wherein in the foregoing steps, the (j) objects, for a given $\alpha$, are not collected in a product, rather a probability is determined such that the product is taken only after mixing over all classes $\alpha$, thus, different j objects are generated from different vertical paths of an induced hierarchy, that is, the paths in the hierarchy associated with non-null values of $I_{i\alpha}$, and all the instances of the hidden variable $I_{i\alpha}$ obtain real values after a re-estimation using a modified EM process, and wherein as $\alpha$ is able to be any node in the hierarchy, the (i) objects are able to be assigned to different levels of the hierarchy, accordingly, implementation of the model results in a pure soft hierarchical clustering of both (i) and (j) objects by eliminating any hard assignments of these objects.

14. A method performed by a processor for clustering data in a database, the method comprising:

receiving a request from a requesting entity to determine topics associated with a collection of documents, each document including a plurality of words and being represented as a set of (document, word) pairs, the document of the pairs being (i) and the words of the pairs being (j);

determining the topics associated with the collection of documents based on a hierarchy created by successively splitting nodes including a plurality of clusters, wherein each cluster reflects a topic and a document in the collection assignable to a set of clusters in the hierarchy based on different words included in the document, and wherein each cluster in the set is able to be associated with different paths in the hierarchy;

storing a representation of the hierarchy in a memory; and making the representation available to the requesting entity, wherein in the foregoing steps, the (j) objects, for a given $\alpha$, are not collected in a product, rather a probability is determined such that the product is taken only after mixing over all classes a, thus, different j objects are generated from different vertical paths of an induced hierarchy, that is, the paths in the hierarchy associated with non-null values of $I_{i\alpha}$, and all the instances of the hidden variable $I_{i\alpha}$ obtain real values after a re-estimation using a modified EM process, and wherein as a is able to be any node in the hierarchy, the (i) objects are able to be assigned to different levels of the hierarchy, accordingly, implementation of the model results in a pure soft hierarchical clustering of both (i) and (j) objects by eliminating any hard assignments of these objects.

15. A computer program product, comprising a computer usable medium having a computer readable program code embodied therein, the computer readable program code adapted to be executed by a computer to implement a method for clustering a plurality of multi-word documents, wherein each document includes a plurality of words and is represented as a set of (document,word) pairs, represented as documents and words (i,j) into a hierarchical data structure including a root node successively split to produce a plurality of sub-nodes, wherein each sub-node is associated with a topic cluster based on the plurality of documents, the method comprising:

retrieving a first document; associating the first document with a first topic cluster based on a first portion of the first document;

associating the first document with a second topic cluster based on a second portion of the document; and providing a representation of topics associated with the plurality of multi-word documents based on the hierarchical data structure including the first and second topic clusters, wherein the first and second topic clusters are associated with a different sub-node, wherein a probability of observing any pair of co-occurring objects represented as the set of (document,word) pairs, the document of the pairs being (i) and the words being (j), is modeled by defining a variable $I_{r\alpha}$ which controls assignment of documents to the hierarchy, such that it is dependent on a particular (document,word) pair (i,j) under consideration during a topical clustering process, and a class $\alpha$ ranges over all nodes in an induced hierarchy in order to assign a document (i object) to any node in the hierarchy, not just leaf nodes, and a class v is defined as an ancestor of $\alpha$ in the hierarchy, the constraint on v ensuring that the nodes are hierarchically organized.

16. The computer program product of claim 15, wherein the first and second portions contain at least one unique word.

17. The computer program product of claim 15, wherein associating the first document with a first topic cluster comprises:

assigning the plurality of multi-word documents to a first class;

setting a probability parameter to an initial value; and determining, for the first document at the value of the parameter, a probability of an assignment of the first document to the first topic cluster based on a word included in the first document and the first class.

18. The computer program product of claim 15, wherein associating the first document with a second topic cluster comprises:

assigning the plurality of multi-word documents to a first class;

setting a probability parameter to an initial value; and determining a probability of an assignment of the first document to the second topic cluster based on a word included in the first document and the first class.

19. The computer program product of claim 15, wherein providing a representation comprises:

providing the representation after each document in the plurality of multi-word documents has been associated with to at least one topic cluster corresponding to a sub-node in the hierarchy, wherein any of the plurality of multi-word documents may be associated to more than one topic cluster based on different portions of the respective document.

20. A computer-implemented method for clustering data reflecting users, represented as a set of (data, user) pairs, into a hierarchical data structure including a root node successively split to produce a plurality of sub-nodes, wherein each sub-node represents an action that is performed on a document collection, comprising:

accessing a user data collection reflecting a plurality of users who each perform at least one action on the document collection, wherein each action may be unique;

performing a clustering process that creates the hierarchical data structure, wherein the clustering processing comprises:

retrieving a first user data, associated with a first user, from the user data collection, associating the first user data with a first sub-node based on a first action performed by the first user on the document collection, and associating the first user data with a second sub-node provided the first user data is based on a second action, wherein the first and second sub-nodes are associated with different descendent paths of the hierarchical data structure at the same time;

storing a representation of the hierarchical data structure in a memory; and making the representation available to an entity in response to a request associated with the user data collection.

21. The method of claim 20, wherein each action in the one or more actions includes:

writing to, printing, and browsing the document collection.

22. A computer-implemented method for clustering a plurality of images based on text associated with the images, where each image is represented as a set of pairs (image, image feature) and (image, text feature), into a hierarchical data structure including a root node successively split to produce a plurality of sub-nodes, wherein each sub-node represents a different topic, the method comprising:

accessing an image collection;

performing a clustering process that creates the hierarchical data structure, wherein the clustering processing comprises:

associating a first image with a first sub-node based on a first portion of text associated with the first image, and associating the first image with a second sub-node based on a second portion of text associated with the first image, wherein the first and second sub-nodes are associated with different descendant paths of the hierarchical data structure at the same time;

storing a representation of the hierarchical data structure in a memory; and making the representation available to an entity in response to a request associated with the image collection.

23. A computer-implemented method for clustering customer purchases, represented as a set of (customer, purchase) pairs, into a hierarchical data structure including a root node successively split to produce a plurality of sub-nodes, wherein each sub-node represents a group of customers who purchased the same type of product from one or more business entities, the method comprising:

accessing information associated with a plurality of customers who purchased various types of products from a plurality of business entities;

performing a clustering process that creates the hierarchical data structure, wherein the clustering processing comprises:

associating a first customer with a first sub-node based on a first type of product purchased from a first business entity, and associating the first customer with a second sub-node provided the first customer is based on a second type of product that the first customer purchased from a second business entity, wherein the first and second sub-nodes are associated with different descendant paths of the hierarchical data structure at the same time;

storing a representation of the hierarchical data structure in a memory; and making the representation available in response to a request associated with the customer data collection.

* * * * *